(12) United States Patent
Lou

(10) Patent No.: US 7,752,478 B2
(45) Date of Patent: Jul. 6, 2010

(54) APPARATUS AND METHOD FOR REAL TIME TRACKING USING A QUADRATURE INTERFACE

(75) Inventor: Wenkwei Lou, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 725 days.

(21) Appl. No.: 11/527,181

(22) Filed: Sep. 26, 2006

(65) Prior Publication Data

US 2008/0077819 A1 Mar. 27, 2008

(51) Int. Cl.
G06F 1/14 (2006.01)
(52) U.S. Cl. .......... 713/500; 713/300; 713/320
(58) Field of Classification Search .......... 713/300, 713/320, 500
See application file for complete search history.

(56) References Cited

U.S. PATENT DOCUMENTS

| 4,295,224 | A | * | 10/1981 | Nishimura et al. | ....... 455/156.1 |
|---|---|---|---|---|---|
| 4,599,600 | A | * | 7/1986 | McGuire et al. | ................ 341/6 |
| 4,714,913 | A | * | 12/1987 | Cohen | .......... 341/111 |
| 5,021,781 | A | * | 6/1991 | Salazar et al. | .......... 341/13 |
| 5,854,915 | A | * | 12/1998 | Goff et al. | .......... 710/72 |
| 6,097,319 | A | * | 8/2000 | Liu | .......... 341/8 |
| 6,380,927 | B1 | * | 4/2002 | Ostrum et al. | .......... 345/165 |

* cited by examiner

Primary Examiner—Thomas Lee
Assistant Examiner—Zahid Choudhury
(74) Attorney, Agent, or Firm—Brake Hughes Bellermann LLP (57) ABSTRACT

An apparatus for tracking a real time clock comprising a delay element for receiving a first clock signal and providing a second delayed clock signal, a quadrature interface including a first input and a second input for respectively receiving the first and second clock signals, control logic adapted to provide a state machine including four states, the four states respectively corresponding to a 2-bit gray code such that a current state is selected by determining a correspondence of the first and second inputs to the 2-bit gray code and a counter is incremented upon a transition between a first state and a second state of the state machine.

20 Claims, 6 Drawing Sheets

FIG. 6

APPARATUS AND METHOD FOR REAL TIME TRACKING USING A QUADRATURE INTERFACE

TECHNICAL FIELD

This description relates to digital logic and computer hardware. In particular, this description concerns tracking of a real time clock signal.

BACKGROUND

Computers may be equipped with a real time clock ("RTC") that is used to provide current time and date information to a user. More specifically, a RTC generally refers to a clock that is independent of the perations of the computer on which the clock runs, and that therefore must be able to track a current time even when the computer is turned off, in a power-saving mode, or performing other processing. The RTC thus provides a computer user with the familiar and convenient experience of viewing the current date and time, e.g., while using the computer. Further, the RTC may be used to provide software applications that rely on a knowledge of a current date and time, such as, for example, calendar and/or appointment applications.

A RTC may provide, for example, year, month, week, hour and second information. In so doing, the RTC may include, or rely on, a periodic pulse signal, as well as a state mechanism or counter that may be used to track/count transitions of the periodic pulse signal between states. For example, a Central Processing Unit (CPU) may be used to monitor transitions between states of the RTC.

As referenced above, however, the RTC should operate accurately even when the computer is off or in a low-power mode. For example, some computing devices may periodically enter a low power mode, in order to conserve battery life. However, the computing device (e.g., for the CPU of the computing device) may be unable to monitor the incoming RTC signal when in a low power mode. Consequently, the computing device (e.g., CPU) may be required to 'wake up' or enter a normal operating mode in order to track the incoming RTC signal in an accurate manner. Thus, a benefit of the low power mode may be lost or reduced, e.g., battery life for a battery of the computing device may be spent that could otherwise be conserved. In other words, competing needs exist to minimize power consumption (and thereby maximize battery life) on the one hand, and to maximize RTC accuracy on the other hand.

SUMMARY

This description pertains to an apparatus and method for tracking a real time clock. According to one general aspect, an apparatus for tracking a real time clock includes a delay element for receiving a first clock signal and providing a second delayed clock signal, a quadrature interface including a first input and a second input, wherein the first input receives the first clock signal and the second input receives the second clock signal, control logic adapted to provide a state machine including four states, the four states respectively corresponding to a 2-bit gray code such that a current state is selected by determining a correspondence of the first and second inputs to the 2-bit gray code, and the control logic is further adapted to provide a counter, the counter incremented upon a transition between a first state and a second state of the state machine.

According to another general aspect, a real time clock may be tracked. A second clock signal is generated from a first clock signal, where the second clock signal comprises a delayed replica of the first clock signal. A current state is selected from four states respectively corresponding to a 2-bit gray code, wherein the current state is determined by a correspondence of first clock signal and the second clock signal to the 2-bit gray code. A counter may be incremented upon a transition between a first state and a second state of the four states.

According to another general aspect, a human interface device ("HID") with real time clock tracking includes a quadrature interface, the quadrature interface including a first input and a second input, wherein the first input receives a clock signal and the second input receives a delayed replica of the clock signal. The HID also includes control logic adapted to provide a state machine including four states, the four states respectively corresponding to a 2-bit gray code and wherein a current state is selected by determining a correspondence of first and second inputs to the 2-bit gray code. The control logic is further adapted to provide a counter configured to be incremented upon a transition between a first state and a second state of the state machine.

The details of one or more implementations are set forth in the accompanying drawings and the description below. Other features will be apparent from the description and drawings, and from the claims.

DETAILED DESCRIPTION

Figure 1:
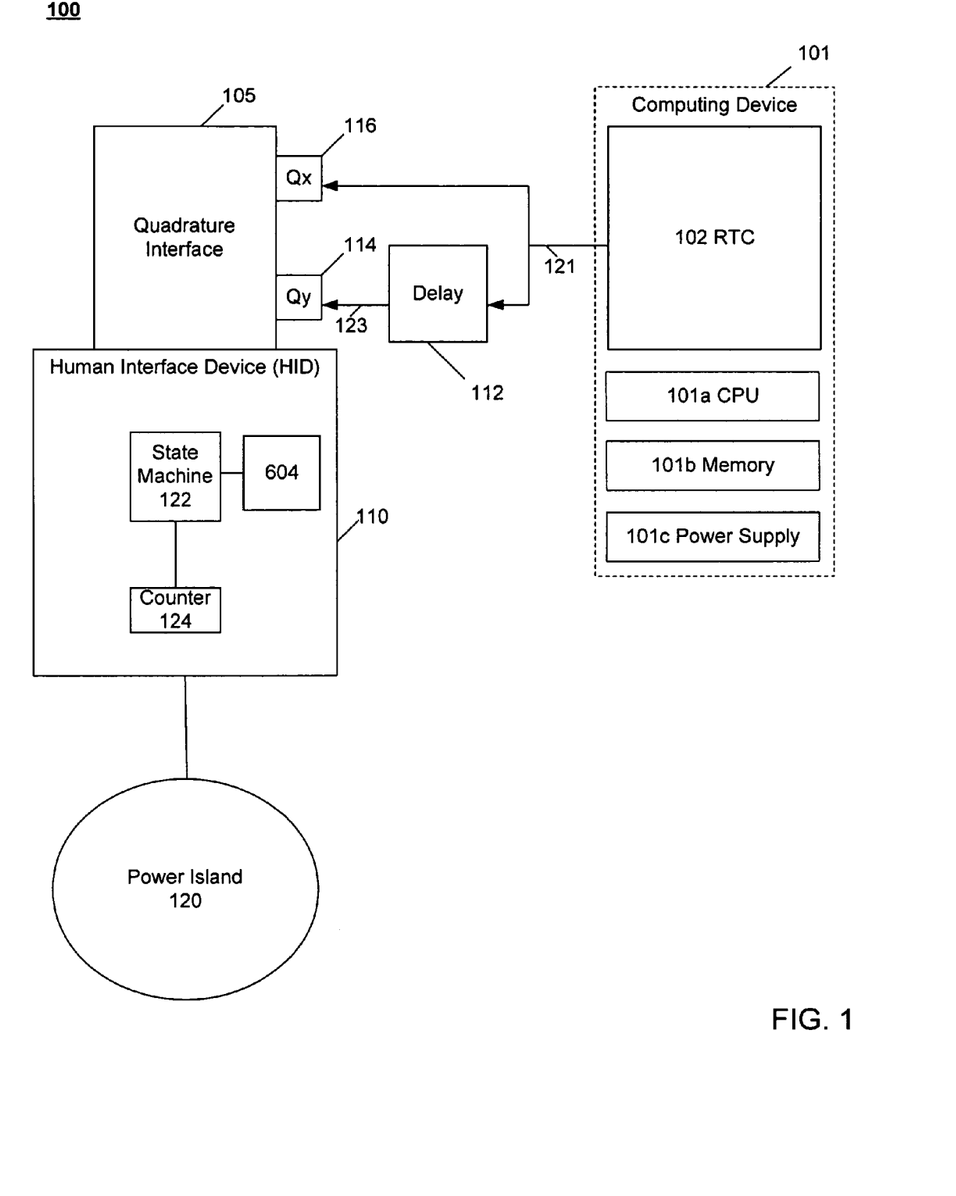
FIG. 1 is a block diagram of an apparatus for tracking a real time clock according to one embodiment.

FIG. 1 is a block diagram of an apparatus 100 for tracking a real time clock (RTC) 102 according to one embodiment. The apparatus 100 provides a low power solution for tracking the RTC 102 of a computing device 101, where the apparatus 100 requires few, if any, additions or modifications to existing hardware of the computing device 101.

In the example of FIG. 1, the apparatus 100 provides tracking of the RTC 102 using a human interface device ("HID") 110, or, more specifically, using a power island 120 that is associated with the HID 110 and that may be independent of a power supply 101c of the computing device 101 (or of a separate power supply of the HID 110, not shown). The power island 120 may be used to provide a low power operation mode for the HID 110, and, in so doing, offers the ability to track the RTC 102 with reduced power, thereby reducing or eliminating use of a CPU 101a or power supply 101 c of the 4. computing device 101 in tracking the RTC 102.

In FIG. 1, the HID 110 should generally be understood to represent and include virtually any device that allows a human user to interface with the computing device 101. For example, the HID 110 may include a mouse, keyboard, pointing device, trackball, touchpad, joystick, or any device that translates a detected human action into an action of the computing device 101. Such actions of the computing device 101 should be apparent, and may include, for example, modification of a display or other output of the computing device, or performance of a calculation or other computation of the computing device 101.

The HID 110 may interfacer with, or connect to, the computing device 101 using any of a number of known techniques. For example, the HID 110 may plug into a Universal Serial Bus (USB) port (not illustrated in FIG. 1) of the computing device 101, or may communicate with the computing device 101 using a Bluetooth or other wireless connection. In the example of FIG. 1, the computing device 101 is illustrated generically as including the RTC 102, the CPU 101a, the memory 101b, and the power supply 101c; however, it should be understood that many other distribution of components may be included, depending on a nature and use of the computing device 101. In some example implementations, the HID 110 may-be integrated or otherwise incorporated into the computing device 101. In other implementations, the RTC 102 may be implemented as a module on the HID 110.

The HID 110 interfaces with the computing device 101 in the example of FIG. 1 using a quadrature interface 105. The quadrature interface 105 may be used during normal operation of the HID, 110, for example, to determine both a movement and a direction of the HID 110. For example, where the HID 110 includes a mouse or other pointing device, then known optical or mechanical techniques may be used to create a two phase output to be translated into a motion and direction of a cursor or other pointer on a display of the computing device 101 (e.g., along a defined x-axis and y-axis).

In the apparatus 100 of FIG. 1, the HID 110 is used to track the RTC 102 in a manner that minimizes power consumption of the power supply 101c of the computing device 101, while maintaining an accuracy and availability of the RTC 102. More specifically, the HID 110 is configured to use/provide suitable signals conforming to the quadrature interface 105, but that also maintain state information associated with the RTC 102 (e.g., indicating time and date).

For example, as shown, the quadrature interface 105 may include Qx input 116 and Qy input 114. The RTC 102 provides a clock pulse signal (t) 121, which is received at the Qx input 116 and at a delay element 112. The delay element 112 may thus generate a delayed clock pulse signal (t') 123. In the example of FIG. 1, clock pulse signal 121 is provided to Qx input 116 on quadrature interface 105. Delayed clock pulse signal 123 is provided to Qy input 114 on quadrature interface 105.

The delay element 112 may be any apparatus for receiving an input signal and supplying a delayed replica of the input signal. For example, delay element 112 may include a circuit characterized by a resistor-capacitor (RC) time constant, which may be as simple as a resistor and capacitor coupled in a series connection. Of course, other delay elements, e.g., a buffer chain, also may be used, as would be apparent.

In the example of FIG. 1, as referenced above, the HID 110 may operate in a low-power mode and be supplied with power by the power island 120. HID may include hardware circuitry configured to execute a state machine 122 and a counter 124. As described in more detail below, the state machine 122 and counter 124 may be updated as a function of signals received at Qx input 116 and Qy input 114. According to an alternative embodiment, state machine 122 and counter 124 may be implemented directly on quadrature interface 105.

Power island 120 may provide an isolated island of power for HID 110. HID 110 may operate in a very low quiescent power mode utilizing power only from power island 120 while CPU 101a is in a sleep mode. According to one embodiment, CPU 101a may be awakened upon generation of an interrupt, for example when a user interacts with a peripheral device such as a mouse coupled to HID 110. Consequently, a count from the counter 124 may be used to track RTC 102, even when the CPU 101a and/or the HID 110 are in a low power niode(s).

According to one embodiment, HID 110 includes a clock 604, which may operate at lower power than a clock driving CPU 101a. Thus, state machine 122 and counter 124, which provide for tracking of RTC 102 without the involvement of processor 101a (which would typically require higher power) and can operate at low power, only requiring the quiescent power provided by power island 120. The structure of state machine 122 and its relationship to signals received at Qx input 116 and Qy input 114 are described in more detail below.

Figure 2:
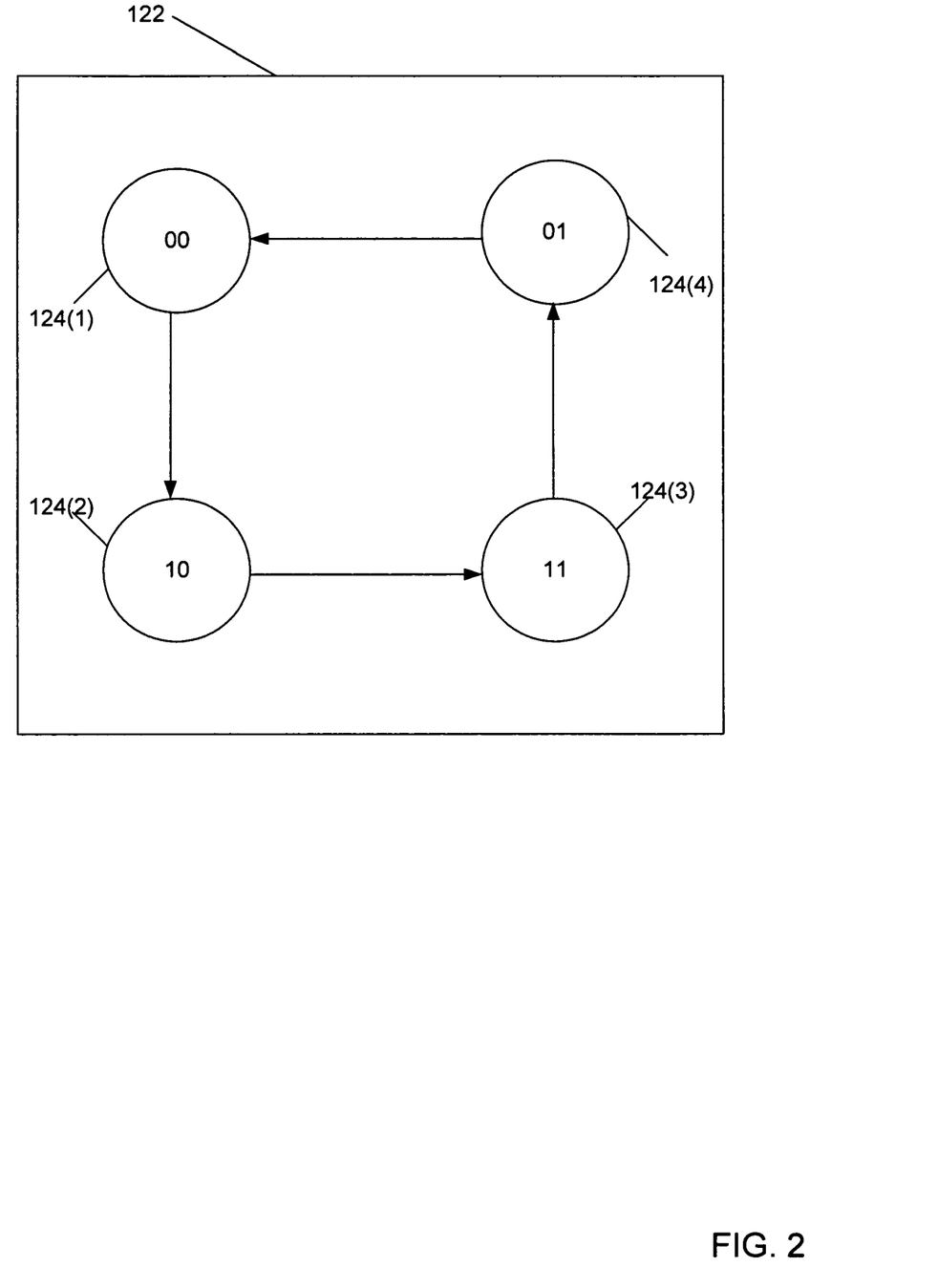
FIG. 2 is a block diagram of a state machine that may be used in the apparatus of FIG. 1.

FIG. 2 is a block diagram of a state machine according to one embodiment. For example, the state machine 122, may be configured to implement four states 124(1)-124(4) and a state transition matrix (not shown). States 124(1)-124(4) correspond to 2-bit gray codes 00, 10, 11 and 01, respectively. As will be described in detail below, a current state among states 124(1)-124(4) may be determined as a function of clock pulse signal 121 and delayed clock pulse signal 123.

In particular, in an example embodiment, the first digit of a gray code may correspond to clock pulse signal 121, while the second digit of a gray code may correspond to the delayed clock pulse signal 123. In an alternative embodiment, these roles may be reversed, and the first digit of a gray code may correspond to the delayed clock pulse signal 123, while the second digit of a gray code may correspond to the clock pulse signal 121. As just referenced, since each clock pulse signal 121, 123 may be high or low, four possible states result, which may be represented in binary form gray code signal(s) as 00, 01, 10, and 11.

Thus, for example, if both clock pulse 121 and delayed clock pulse 123 are low, state 124(1) is selected. If clock pulse 121 is high and delayed clock pulse 123 is low, state 124(2) is selected. If both clock pulse 121 and delayed clock pulse 123 are high, state 124(3) is selected. Finally, if clock pulse 121 is low and delayed clock pulse 123 is high, state 124(4) is selected.

As described below, clock pulse 121 and delayed clock pulse 123 may be configured such that states 124(1)-124(4) are visited in a cyclical fashion. That is, the combination of clock pulse 121 and delayed clock pulse 123 may be used to describe a gray code.

According to one example embodiment, state machine 122 may be implemented in hardware. According to an alternative example embodiment, state machine 122 may be implemented on a general purpose central processing unit ("CPU"). For example, some or all of the quadrature interface 105, the processor 125 (or other dedicated hardware), the state machine 122, and/or the counter 124 may be implemented in the context of one or more integrated circuit microchip(s) (chip(s)).

Figure 3:
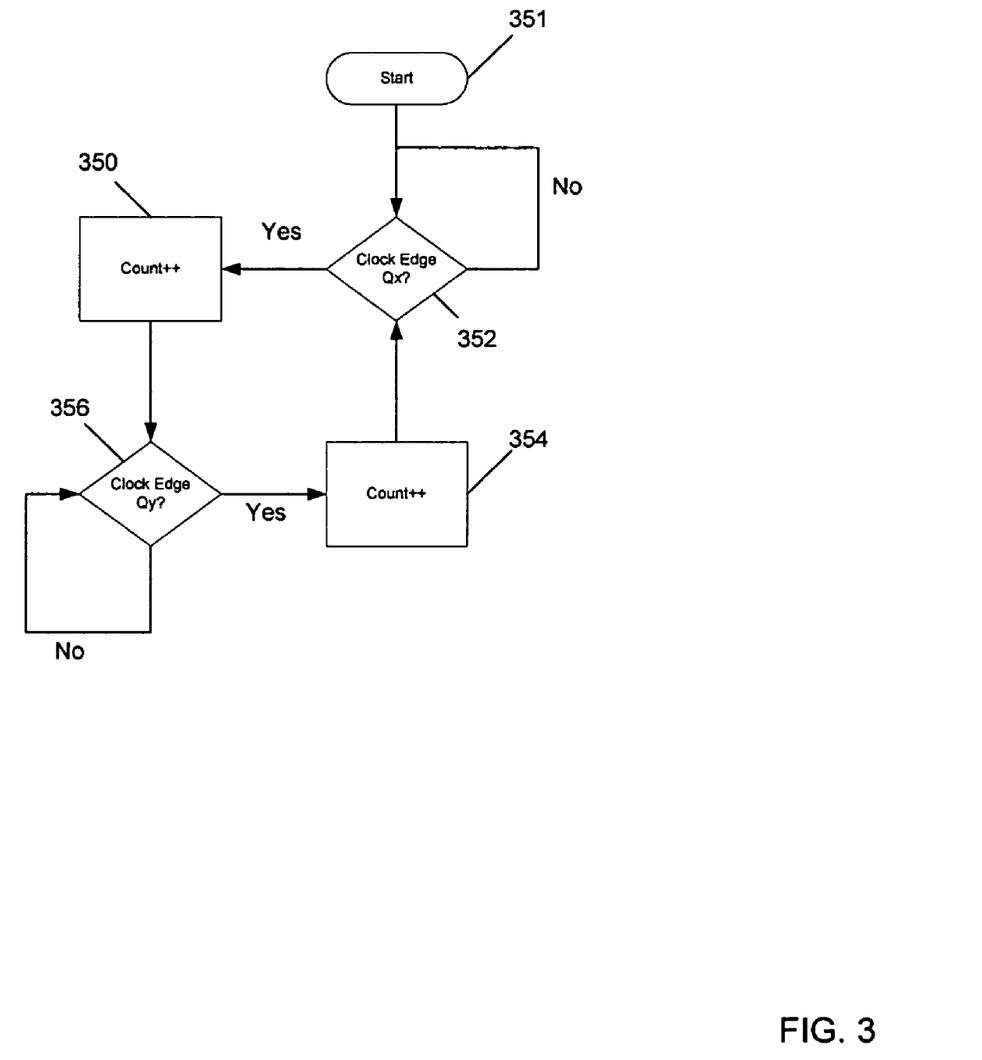
FIG. 3 is a flowchart for a process implementing a state machine on a CPU according to one embodiment.

FIG. 3 is a flowchart for a process implementing a state machine on a CPU according to one embodiment. The process is initiated i(351). Qx input 116 is polled to detect a clock edge, and, if a clock edge is detected on Qx input 116 (352), then the counter 124 (count) is incremented (350). If no clock edge is detected on Qx input 116 (352), then Qx is again (and repeatedly) polled for a clock edge.

Further, Qy input 114 also may be polled to detect a clock edge (356). If a clock edge is detected on Qy input 114 (356), then the counter 124 is incremented (354). If no clock edge is detected on the Qy input (356), then Qy is again (and repeatedly) polled for a clock edge (356).

Figure 4:
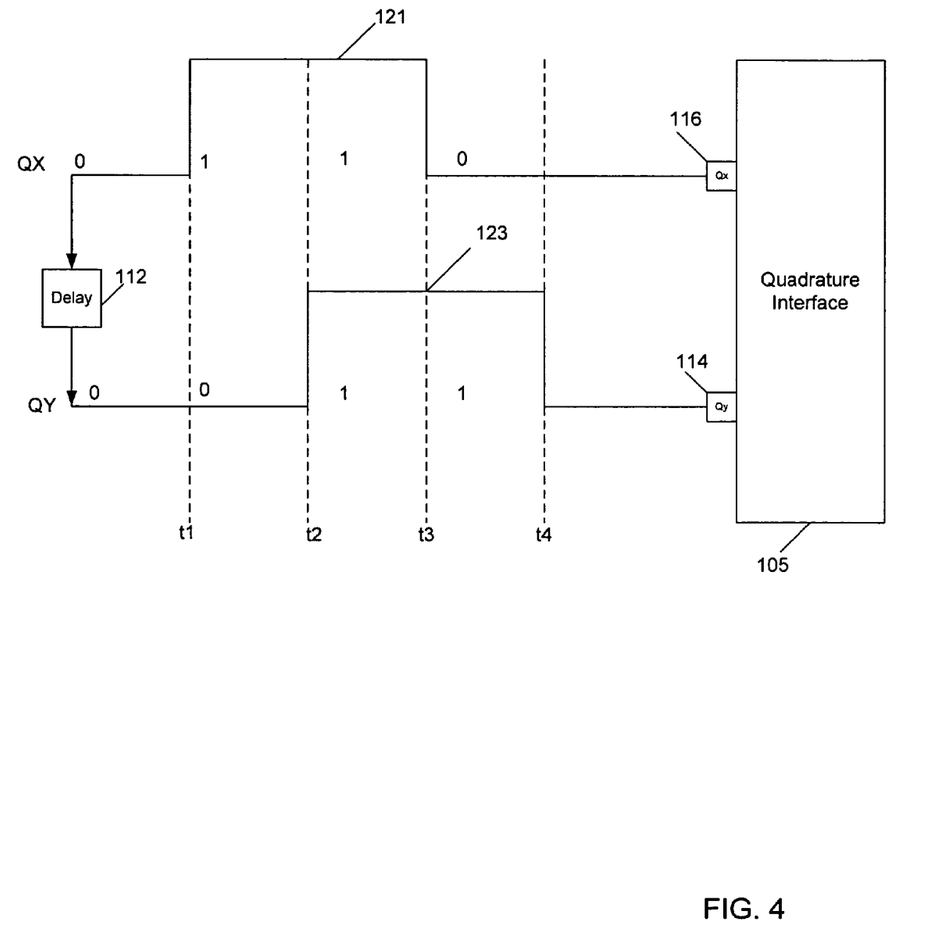
FIG. 4 is a timing diagram for a clock pulse and delayed clock pulse signal according to one embodiment.

FIG. 4 is a timing diagram for a clock pulse and delayed clock pulse signal according to one embodiment. Before time t1, both clock pulse signal 121 and delayed clock pulse signal 123 are low and state 124(1) is selected (gray code 00). At time t1, clock pulse signal 121 goes high while delayed clock pulse signal 123 remains low and between times t1 and t2 state 124(2) is selected (gray code 10). At time t2, delayed clock signal 123 goes high while clock signal 121 remains high and between times t2 and t3 state 124(3) is selected (gray code 11). At time t3, clock signal 121 goes low while delayed clock signal 123 remains high and between times t3 and t4 state 124(4) is selected (gray code 01).

Figure 5:
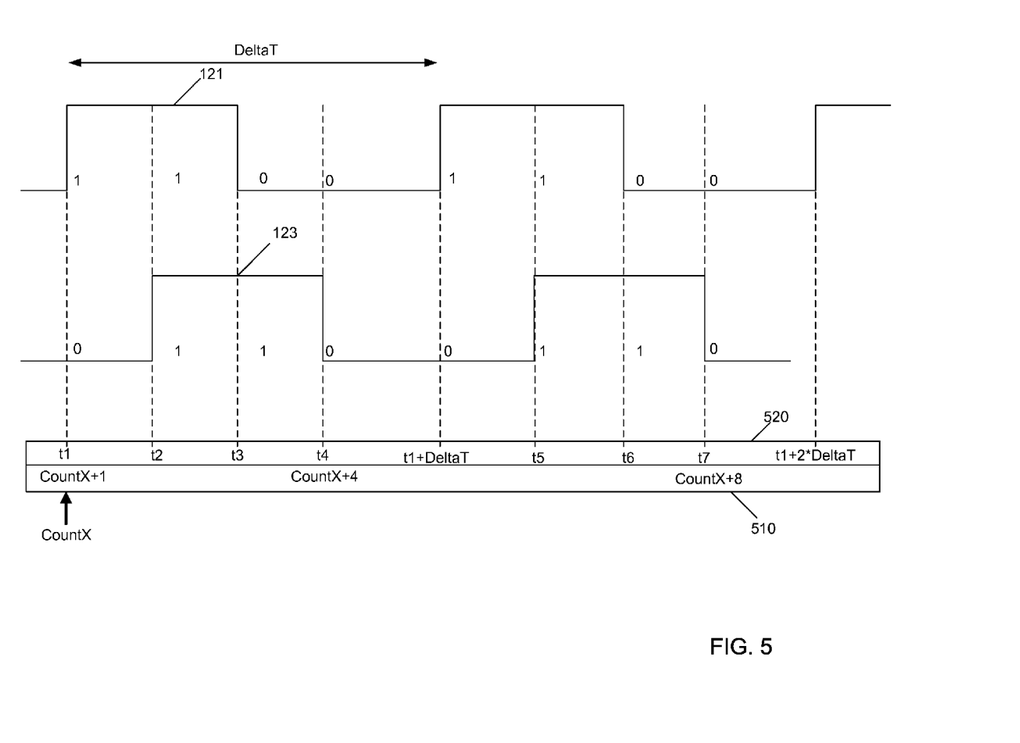
FIG. 5 is a timing diagram showing a relationship between real time and a counter according to one embodiment.

FIG. 5 is a timing diagram showing a relationship between real time and a counter according to one embodiment. The example of FIG. 5 shows a relationship between real time 520 and a counter variable ("CountX") 510. Clock pulse 121 signal has period DeltaT. CountX 510 is incremented upon a state transition of state machine 122 (see FIG. 2) and therefore upon either an edge transition of clock pulse 121 or delayed clock pulse 123. Thus, upon a complete cycle through state machine 122, CountX is incremented by 4.

Figure 6:
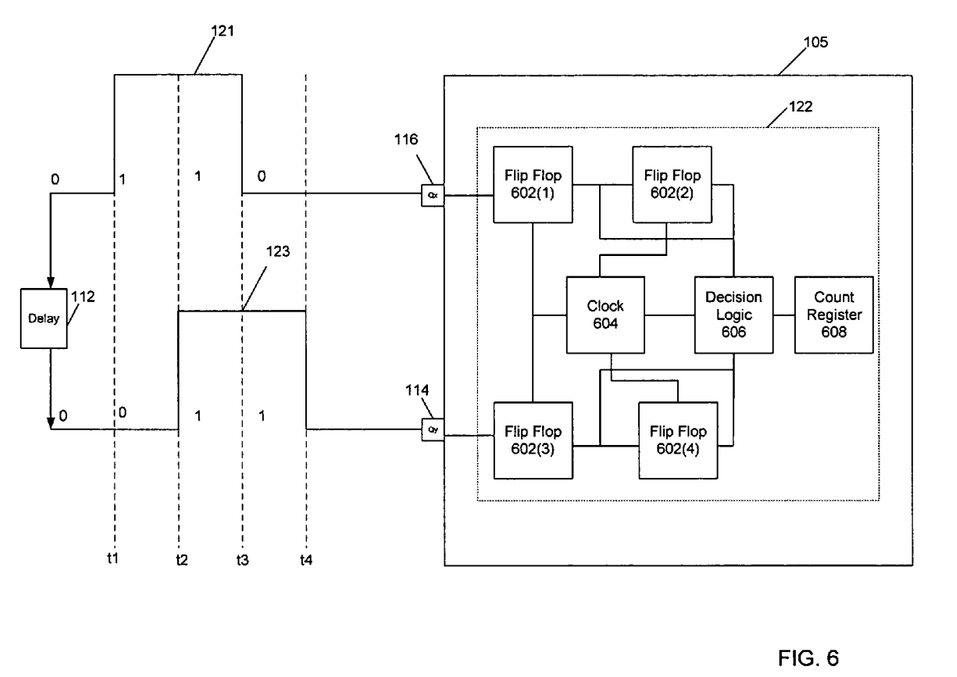
FIG. 6 is a detailed block diagram of a quadrature interface including a state machine, which may be used for tracking a RTC.

FIG. 6 is a detailed block diagram of a quadrature interface including a state machine, which may be used for tracking a RTC. As noted earlier, state machine 122 may be included as part of HID 110 but according to an alternative example embodiment may be included as part of quadrature interface 105 as shown in FIG. 6.

State machine 122 includes flip flops 602(1)-602(4), clock 604, decision logic 606 and count register 608. According to one-embodiment, flip flops 602(1) and 602(3) track a next state for state machine 122 while flip flops 602(2) and 602(4) track a current state for state machine 122. Clock 604 may be a low power clock, which among other functions, may be used to drive latching of signals in flip flops 602(1)-602(4).

As flip flops 602(1) and 602(3) store a next state for state machine 122, upon a clock edge generated by clock 604, the state of flip flop 602(1) is transmitted to flip flop 602(2) and the state of flip flop 602(3) is transmitted to flip flop 602(4). That is, the current state (stored in flip flops 602(2) and 602(4)) is replaced by the next state (stored in flip flops 601(1) and 601(3)). In addition, upon a clock edge generated by clock 604, clock signal 121 is latched by flip flop 602(1) and delayed clock signal 123 is latched by flip flop 602(3). Thus, flip flops 602(1) and 602(3) track a next state for state machine 122. In particular flip flop 602(1) tracks a next state for Qx and flip flop 602(3) tracks a next state for Qy.

Upon the updating of next and current states stored in flip flops 602(1)-602(4), decision logic 606 controls whether count register 608 should be incremented. According to one embodiment, count register 608 is incremented only if the next state stored in flip flops 602(1) and 602(3) is a valid next state from the current state stored in flip flops 602(2) and 602(4). In particular, according to one example embodiment, decision logic 606 only causes count register 608 to be incremented if the next state is related to the current state as a succeeding element of a gray code as described above. Next and current states may not be successive elements of a gray code, for example, if noise has introduced errors.

According to one embodiment, in order to satisfy the Nyquist criterion, clock 604 operates at least twice the frequency between edges of clock signal 121 and delayed clock signal 123. Thus, clock 604 may operate at a frequency of at least $2*(1/(t2-t1))$.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus for tracking a real time clock comprising:
a delay element adapted to receive a first clock signal and provide a second clock signal, wherein the second clock signal is delayed with respect to the first clock signal;
a quadrature interface, the quadrature interface including a first input and a second input, wherein the first input is adapted to receive the first clock signal and the second input is configured to receive the second clock signal; and
control logic adapted to provide a state machine including four states, the four states respectively corresponding to a 2-bit gray code and wherein a current state is selected by determining a correspondence of the first and second inputs to the 2-bit gray code,
wherein the control logic is further adapted to provide a counter, the counter being adapted to increment upon a transition between a first state and a second state of the state machine.

2. The apparatus of claim 1, wherein the quadrature interface is integrated with a human interface device ("HID").

3. The apparatus according to claim 2, wherein the HID is configured to operate in a low power state.

4. The apparatus of claim 2, wherein the HID includes a power island.

5. The apparatus of claim 2, wherein the HID includes a mouse input.

6. The apparatus of claim 2, where the HID includes a keyboard input.

7. The apparatus of claim 1, wherein the delay element includes a RC ("Resistor-Capacitor") circuit.

8. A method for tracking a real time clock comprising:
generating a second clock signal from a first clock signal, the second clock signal comprising a delayed replica of the first clock signal;
selecting a current state from four states, the four states respectively corresponding to a 2-bit gray code, wherein the current state is determined by a correspondence of the first clock signal and the second clock signal to the 2-bit gray code; and
incrementing a counter upon a transition between a first state and a second state of the four states.

9. The method according to claim 8, further comprising providing a time output as a function of the counter.

10. The method according to claim 8, further comprising providing a date output as a function of the counter.

11. The method according to claim 8, further comprising providing a year output as a function of the counter.

12. The method according to claim 8, wherein generating the second clock signal from the first clock signal comprises providing the first clock signal to an RC delay circuit.

13. The method according to claim 8, wherein selecting the current state from the four states comprises detecting a clock edge on one of the first clock signal and the second clock signal, the clock edge indicating a transition from a first binary value of the gray code to a second binary value of the gray code.

14. A human interface device ("HID") with RTC tracking comprising:
a quadrature interface, the quadrature interface including a first input and a second input, wherein the first input is adapted to receive a clock signal and the second input is adapted to receive a delayed replica of the clock signal; and control logic adapted to provide a state machine including four states, the four states respectively corresponding to a 2-bit gray code and wherein a current state is selected by determining a correspondence of the first and second inputs to the 2-bit gray code;

wherein the control logic is further adapted to provide a counter, the counter being configured to increment upon a transition between a first state and a second state of the state machine.

15. The apparatus according to claim 14, wherein the HID is configured to operate in a low power state.

16. The apparatus of claim 14, wherein the HID includes a power island.

17. The apparatus of claim 14, wherein the HID includes a mouse input.

18. The apparatus of claim 14, wherein the HID includes a keyboard input.

19. The apparatus of claim 14, wherein the delayed replica of the clock signal is generated by passing the clock signal through a delay element.

20. The apparatus of claim 19, wherein the delay element includes a RC ("Resistor-Capacitor") circuit.

* * * * *